United States Patent
Rambadt et al.

(10) Patent No.: US 8,416,059 B1
(45) Date of Patent: Apr. 9, 2013

(54) RFID SYSTEM HOUSING

(75) Inventors: John Rambadt, Gravette, AR (US);
Barry Musteen, Centerton, AR (US);
Russell Xanders, Gravette, AR (US);
Tim Mills, Gravette, AR (US)

(73) Assignee: R&R Packaging, Inc., Gravette, AR (US)

( * ) Notice: Subject to any disclaimer, the term of this patent is extended or adjusted under 35 U.S.C. 154(b) by 1156 days.

(21) Appl. No.: 12/315,944

(22) Filed: Dec. 8, 2008

Related U.S. Application Data (60) Provisional application No. 61/133,597, filed on Jul. 1, 2008.

(51) Int. Cl.
*H04Q 5/22* (2006.01)
*H01R 4/66* (2006.01)
*H01R 13/648* (2006.01)

(52) U.S. Cl.
USPC .......................................... 340/10.1; 439/102

(58) Field of Classification Search .......................... None
See application file for complete search history.

(56) References Cited

U.S. PATENT DOCUMENTS

| | | | |
|---|---|---|---|
| 5,347,263 A | 9/1994 | Carroll et al. | 340/572 |
| 5,378,880 A | 1/1995 | Eberhardt | 235/439 |
| 5,430,441 A | 7/1995 | Bickley et al. | 340/825.54 |
| 5,446,447 A | 8/1995 | Carney et al. | 340/572 |
| 5,519,381 A | 5/1996 | March et al. | 340/572 |
| 6,392,544 B1 | 5/2002 | Collins et al. | 340/572.7 |
| 6,396,438 B1 | 5/2002 | Seal | 342/127 |
| 6,445,297 B1 | 9/2002 | Nicholson | 340/572.7 |
| 6,509,836 B1 | 1/2003 | Ingram | 340/572.7 |
| 6,747,560 B2 | 6/2004 | Stevens, III | 340/572.4 |
| 6,903,656 B1 | 6/2005 | Lee | 340/572.1 |
| 7,036,734 B2 | 5/2006 | Baker | 235/451 |
| 7,411,507 B2 | 8/2008 | Casden | 340/572.7 |

*Primary Examiner* — Brian Zimmerman
*Assistant Examiner* — Cal Eustaquio
(74) *Attorney, Agent, or Firm* — Keisling & Pieper PLC; Meredith K. Lowry; Trent C. Keisling (57) ABSTRACT

A housing for a RFID system is provided including one or more radio frequency antennas, one or more RFID readers, and a central frame. The central frame supports the antenna(s) and reader(s) therein. The central frame includes a bollard, a frame portion, and a tile exterior composed of an impact-resistant plastic. The frame and tile exterior are protected by the bollard from forceful impacts to the central frame.

20 Claims, 7 Drawing Sheets

RFID SYSTEM HOUSING

CROSS-REFERENCE TO RELATED APPLICATIONS

This application claims priority to and is a continuation-in-part of U.S. application Ser. No. 61/133,597, filed Jul. 1, 2008, which is hereby expressly incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to the field of radio frequency identification (RFID) systems. In particular, the present invention relates specifically to structures for supporting RFID antennas and/or RFID readers.

2. Description of the Known Art

As will be appreciated by those skilled in the art, radio frequency identification (RFID) has become a prevalent method for identifying products. Namely, manufacturers and large-scale retailers have increasingly implemented the use of RFID technology to track product locations in route to retail outlets, within storage locations, and within retail stores. RFID readers are used to receive data transmitted from RFID tags. The data transmitted by the tag may provide identification or location information, or specifics about the product tagged, such as price, color, date of purchase, etc. Art relevant to this field can be found in class 235, subclasses 435, 439, 451 and class 343, subclasses 700, 874, 875. Patents disclosing information relevant to RFID technology include U.S. Pat. No. 5,347,263, issued to Carroll et al. on Sep. 13, 1994; U.S. Pat. No. 5,430,441, issued to Bickley et al. on Jul. 4, 1995; U.S. Pat. No. 5,446,447, issued to Carney et al. on Aug. 29, 1995; U.S. Pat. No. 5,519,381, issued to Marsh et al. on May 21, 1996; U.S. Pat. No. 6,392,544, issued to Collins et al. on May 21, 2002; U.S. Pat. No. 6,396,438, issued to Seal on May 28, 2002; U.S. Pat. No. 6,509,836, issued to Ingram on Jan. 21, 2003; U.S. Pat. No. 6,747,560, issued to Stevens on Jun. 8, 2004; and U.S. Pat. No. 6,903,656, issued to Lee on Jun. 7, 2005. Each of these patents is hereby expressly incorporated by reference in their entirety.

RFID systems usually include at least one radio frequency antenna and a reader. During a typical usage, the RFID system transmits a radio frequency at a certain frequency or within a certain frequency range towards an RFID tag. An RFID tag typically includes a chip (often smaller than a pin head) and an antenna portion. The energy in the radio waves transmitted onto the tag may be used to "excite" or energize the tag. The chip is often programmed with a globally unique identification (GUID) number, and upon exciting the tag, the GUID number is emitted from the tag in the form of radio waves. A receiving antenna of the RFID system receives the radio waves emitted from the tag, and a reader device extracts the GUID number from the signal in the tag's emitted radio waves. This GUID number may then be correlated to a product or item in a database. The transmitting antenna may be separate from the receiving antenna (e.g., pitch-catch configuration), or they may be one and the same (i.e., transmit and receive with same antenna).

RFID systems may have a variety of forms and configurations for different applications, for example: hand held devices such as a wand; free standing structures monitoring theft detection in retail stores or warehouse inventory tracking; and fixed structures attached to or extending from a building, such as building access locks and toll tag structures above a toll road. In most existing warehouse usages of RFID systems, some or all of the RFID components (e.g., antenna, reader) of the system are exposed. In a warehouse, there are typically forklifts and carts regularly moving boxes and crates of products past and near the RFID system. Hence, there is a likelihood that the exposed RFID components may be bumped, hit, or damaged during regular operation of the warehouse. Many times, an RFID system is tuned and an RFID antenna is set at a particular position and angle for optimum ability to read tags passing thereby. A movement or repositioning of such an antenna in a tuned system may reduce the performance of the system or even render the system inoperable. As the reliance on and usage of RFID tags and systems increases, the demand for rugged and reliable RFID systems is likely to increase. Hence, a need exists for an RFID system that provides increased protection of the RFID components in the system, but without significantly compromising the ability to tune the system, without significantly hindering the performance of the system, and without consuming a significant amount of warehouse space. Furthermore, it would be preferable to provide such a system without it being overly complex and expensive.

Patents disclosing information relevant to housings for RFID readers include U.S. Pat. No. 5,378,880, issued to Eberhardt on Jan. 3, 1995; U.S. Pat. No. 6,445,297, issued to Nicholson on Sep. 3, 2002; U.S. Pat. No. 7,036,734, issued to Baker on May 2, 2006; and U.S. Pat. No. 7,411,507, issued to Casden on Aug. 12, 2008. Each of these patents is hereby expressly incorporated by reference in their entirety.

U.S. Pat. No. 5,378,880, issued to Eberhardt on Jan. 3, 1995 entitled Housing structure for an access control RFID reader. The abstract describes a radio frequency proximity reader has a base plate housing portion that has an essentially rectangular shape with first and second opposed major surfaces and a centrally located bore. A cylindrical housing portion having a concentrically placed bore is attached to the base plate and extends substantially perpendicular to the first major surface, with the bores of the housing portions being substantially aligned. A radio frequency antenna including a cylindrical ferrite core having at least one concentrically wound coil is concentrically located within the cylindrical housing portion. A light emitting diode and a piezo buzzer are provided within the cylindrical housing portion adjacent the second major surface of the base plate. A cable electronically connects the reader to remotely located signal processing circuits. The base plate may be attached to a wall, whereby the first surface abuts the wall. A rectangular cover attached to the base plate covers the second major surface of the base plate.

However, this housing structure fails to provide a stand-alone housing for an RFID reader for use in an open environment, such as a warehouse.

U.S. Pat. No. 6,445,297, issued to Nicholson on Sep. 3, 2002 entitled Modular RFID antenna system. The abstract describes a modular radio frequency identification device (RFID) antenna system including a plurality of modular RFID antenna segments that can be connected in multiple configurations to allow multi-directional RF communication with at least one RF tag that passes through the field of the antenna system from different directions and at different orientations and a configuration system to design, order, configure, test and operate the modular RFID antenna system. However, this modular system does not provide a resilient housing capable of withstanding hard impacts.

U.S. Pat. No. 7,036,734, issued to Baker on May 2, 2006 entitled Free standing column-shaped structure for housing RFID antennas and readers. The abstract explains an RFID system is provided, which includes one or more radio frequency antennas and a generally column-shaped structure. The generally column-shaped structure supports the antenna(s) therein. The structure may include a base portion, a frame portion, one or more paddle portions, and an external body portion. In such case, the frame portion is attached to and supported by the base portion. The frame portion extends along a longitudinal axis of the structure. Each paddle portion is pivotably coupled to the frame portion. Each paddle portion supports one or more antennas attached thereto. The hollow and elongated external body portion is attached to and supported by the base portion. The external body portion extends along the longitudinal axis. The frame portion, the paddle portion(s), and the antenna(s) are located within the external body portion. However, this structure fails to provide a bollard to reduce impacts to the portion and provide a notification access that allows for meaningful interpretation of the RFID reader alters.

U.S. Pat. No. 7,411,507, issued to Casden on Aug. 12, 2008 entitled Metal housing with integral antenna for RFID reader/writer. The abstract describes enhanced physical protection against vandalism for RFID reader/writer units is provided by a relatively thick metal front or housing which also functions as the antenna element of the reader/writer. The metal front is cut or slotted to define a radio frequency antenna integral with the metal front or housing for improved physical protection and good unshielded antenna function. However, this housing structure fails to provide a stand-alone housing for an RFID reader for use in an open environment such as a warehouse.

Thus, it may be seen that these prior art patents are very limited in their teaching and utilization, and an improved RFID reader housing is needed to overcome these limitations.

SUMMARY OF THE INVENTION

The present invention is directed to an improved housing for a radio frequency identification (RFID) system. In accordance with the present invention, a housing for a RFID system is provided including one or more radio frequency antennas, one or more RFID readers, and a central frame. The central frame supports the antenna(s) and reader(s) therein. The central frame includes a bollard, a frame portion, and an external body portion composed of a dense plastic. The frame and external portions are protected by the bollard from forceful impacts to the central frame. The frame portion extends along a longitudinal axis of the structure. The frame portion supports one or more antenna(s) and reader(s) attached thereto. The hollow and elongated external body portion is attached to the frame portion. The external body portion extends along the longitudinal axis. A section of the frame portion, the RFID readers, and the antennas are located within the external body portion.

RFID systems are commonly used in retail stores, warehouses and loading facilities to assist in tracking packages, products, and merchandise labeled with RFID tags. Other industries additionally utilize RFID systems to track movement of vehicles, luggage, or other transient objects. Traditionally, RFID systems are placed in high traffic areas where forklifts and other heavy utility vehicles move about. Thus, the RFID system housings are at risk for impact. Past RFID housings have been composed of strong metals to enable the RFID housing to withstand impact. However, continual impacts over time have been shown to weaken the RFID housing.

Thus, it is an object of the present invention to provide a housing which can withstand impact during every day use. The invention is composed of an impact resistant plastic adapted to withstand impact from forklifts or other utility vehicles.

An object of the present invention is to provide a housing with an impact resistant bollard at the base as part of the housing.

Another object of the present invention is to limit impact to the housing through use of impact resistant recycled plastic on front and back sides of the housing as well as in the bollards.

Another object of the present invention is to maintain integrity of the housing through use of the same impact resistant recycled plastic as the center insert for mounting the RFID system components internally.

Impact resistant plastic is a substantially rigid material which presents some difficulties during installation. To insure integrity to the plastic material, the plastic sides are installed in the external body portion through the use of movement restricting channels. Thus, an object of the present invention is to securely attach the plastic panels to the external body portion while preserving the structural integrity of the plastic. It is a further object of the invention to provide secure attachment channels which can be rapidly deployed and reattached during replacement of plastic panels.

Standard RFID readers provide information through use of lighted panels or similar notification devices. Housings for RFID systems typically relay problems or alerts from the RFID reader to a secondary alert atop of the housing. However, this secondary alert is limited as it typically conveys only a few messages (e.g. recognized scan, faulty scan) and relies upon extra wiring to communicate these messages. Therefore, it is an object of the present invention to provide visual access to the RFID reader to allow for improved information communication and technical support.

Many different RFID readers and antennas are currently offered in the market. Each reader and antenna has a different profile and size. Users of RFID housing typically update hardware as advances are made. Therefore it is an object of the present invention to provide attachment ports for a variety of different sized readers and antennas. It is a further object of the present invention to provide multiple ports for electrical access to allow for user customization.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction there-with, and in which like reference numerals have been employed throughout wherever possible to indicate like parts in the various views.

DETAILED DESCRIPTION OF THE INVENTION

Figure 1:
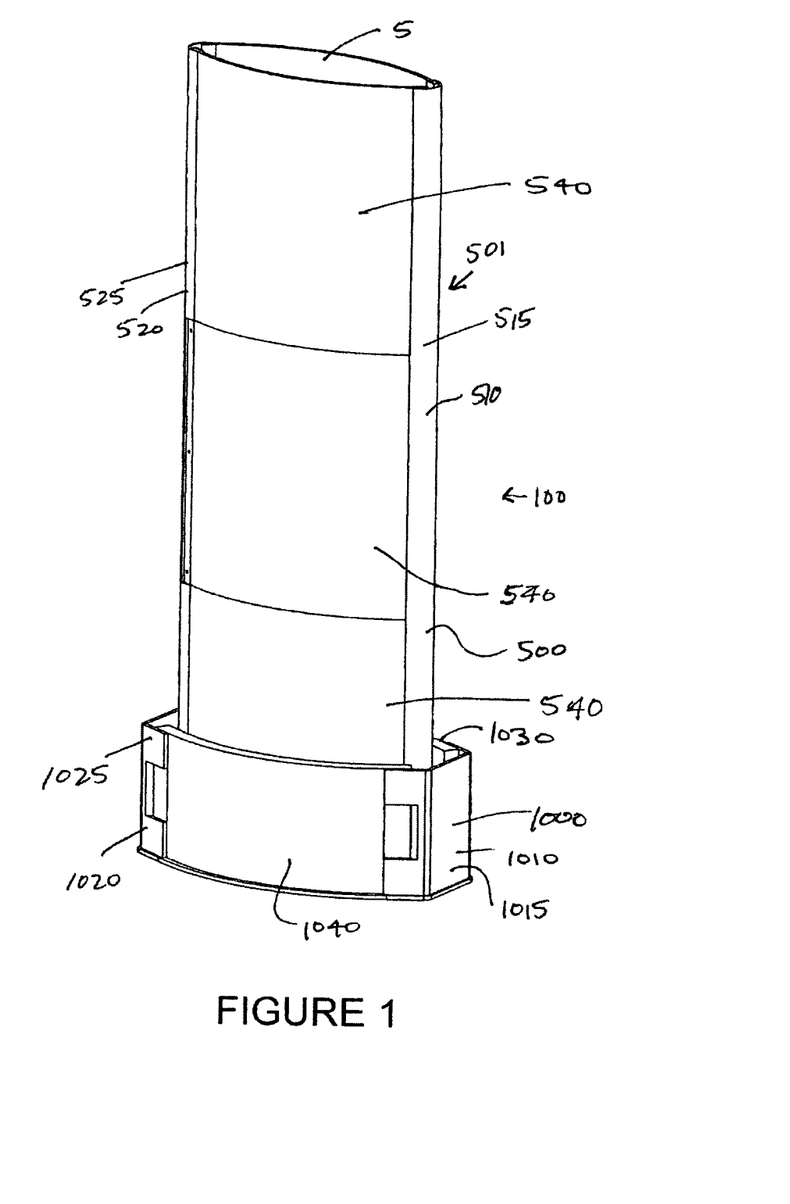
FIG. 1 is a perspective view of our invention, the RFID system housing.
Figure 2:
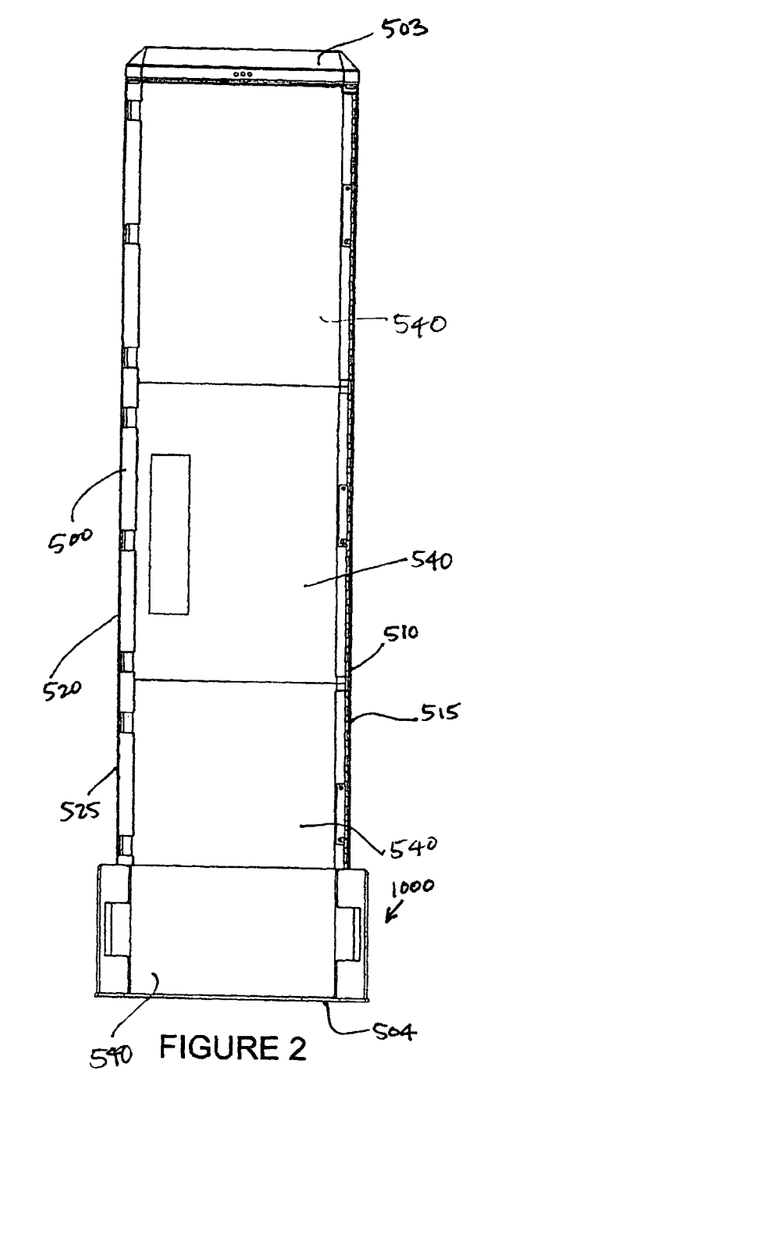
FIG. 2 is a front elevational view of another embodiment of the RFID system housing.
Figure 3:
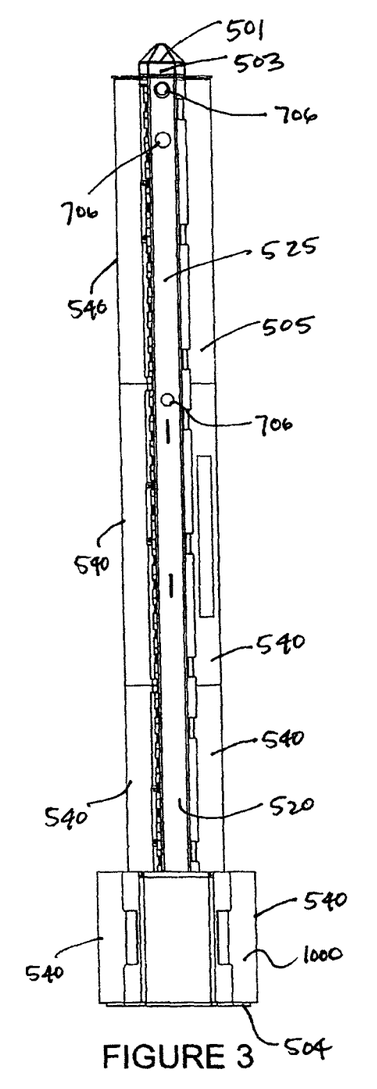
FIG. 3 is a left side elevational view of another embodiment of the RFID system housing.

As shown in FIG. 1 of the drawings, one exemplary embodiment of the present invention is generally shown as a housing 100 for a radio frequency identification (RFID) system 4 for use with RFID tags 5 is provided including one or more radio frequency antennas 6, one or more RFID readers 7 and a central frame 501. The central frame 501 supports the antenna(s) 6 and reader(s) 7 therein. The central frame 501 includes a bollard 1000, a frame portion 500, and a tile exterior 505 composed of a dense plastic. The frame 500 and tile exterior 505 are protected by the bollard 1000 from forceful impacts to the central frame, such as from a forklift 10 or a pallet 11. Each of these elements will be discussed in turn.

Figure 4:
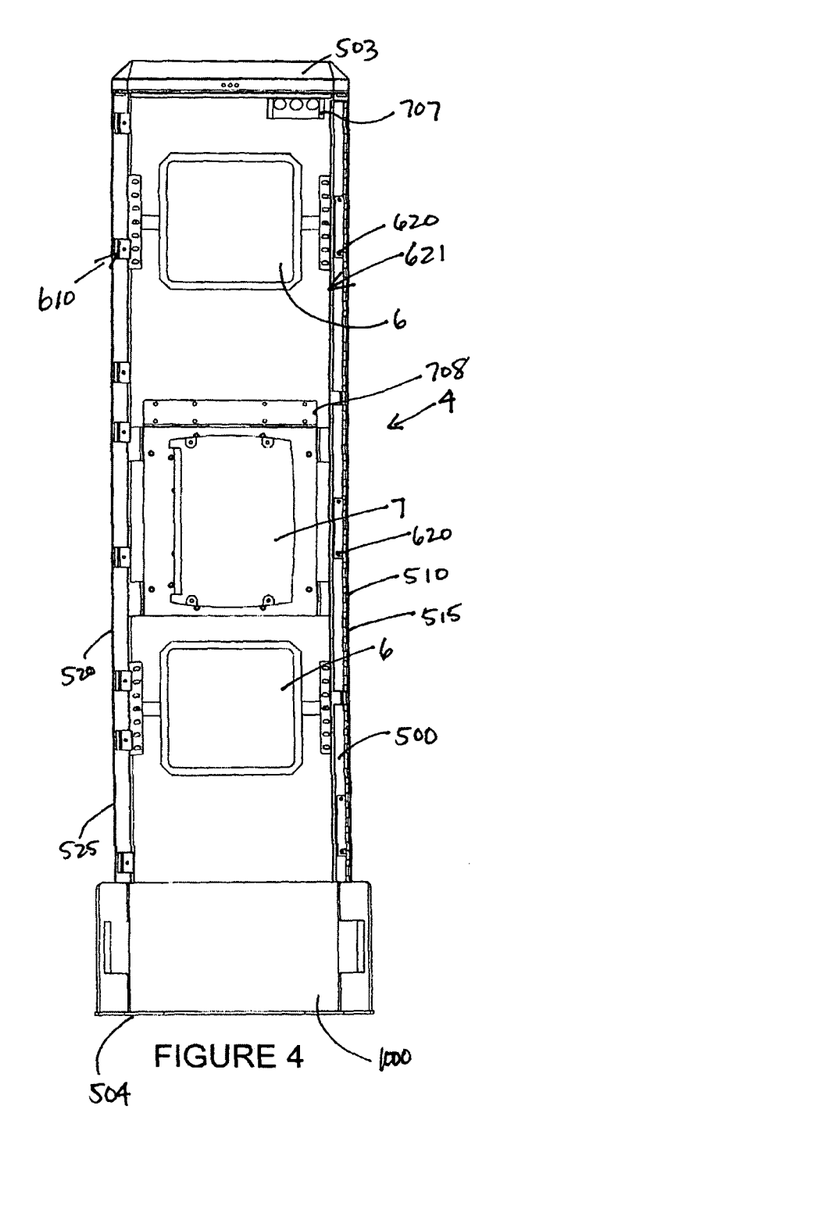
FIG. 4 is a front elevational view of the RFID system housing without the reinforced plastic panels, the rear elevational view being a mirror image thereof.
Figure 5:
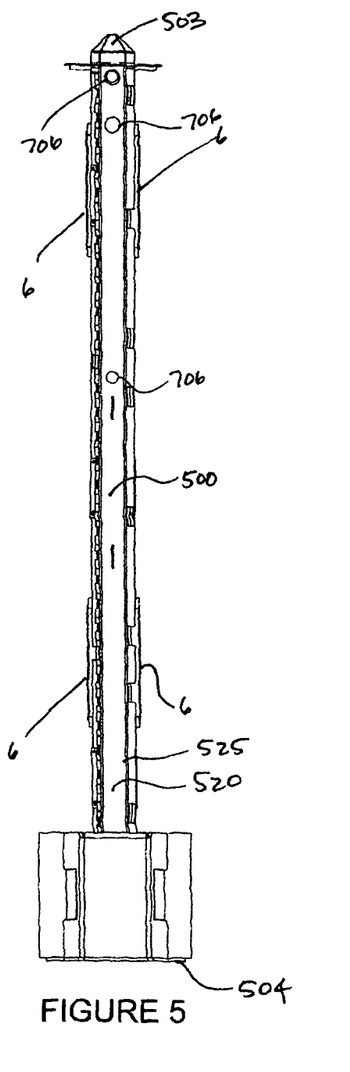
FIG. 5 is a left side elevational view of the same, the right side elevational view being a mirror image thereof.

The frame 500 extends along the longitudinal axis of the structure. The frame 500 supports one or more antenna(s) 6 and reader(s) 7 attached thereto. As shown in FIGS. 1-5, the frame 500 has two vertical pieces 510, 520 on the right 515 and left 525 of the stand 100, a base 504, and a cap 503 at the top of the frame 500. As shown in FIGS. 4-5, the vertical pieces 510, 520 are generally C-shaped with an exterior side 601 facing the exterior of the frame 500, two flanking sides 602, 603, and an interior side 604 facing the interior of the frame 500. The antenna mounts 702 and reader mounts 703 are connected to the interior side 604 of the frame forming the mount frame 701 inside the housing. As shown in FIG. 4, the antenna mounts 702 may be located at the top and bottom of the housing 100 while the reader mounts 703 may be located in the center of the housing 100. Antennas 6 and readers 7 may be mounted on both the front and rear of the housing. Both mounts 702, 703 have multiple attachment apertures 705 to allow a user of the housing 100 to customize the reader 7 and antenna 6 used. Readers 7 and antennas 6 vary in size by manufacturer. Therefore, there is a need in the art to provide multiple apertures 705 for different sized devices.

As shown in FIG. 5, the vertical pieces 510, 520 contain multiple ports 706 providing access for electrical wiring to provide power to the housing 100 and providing access for data transfer wiring to provide remote access or information to support personnel. Within the interior of the housing, an electrical housing 707 provides space for wiring. Additionally a mount 708 for a secondary housing (not shown) providing electrical wiring and multiple electrical sockets can be placed within the housing 100 to allow for multiple devices to be powered by the housing 100.

Figure 6:
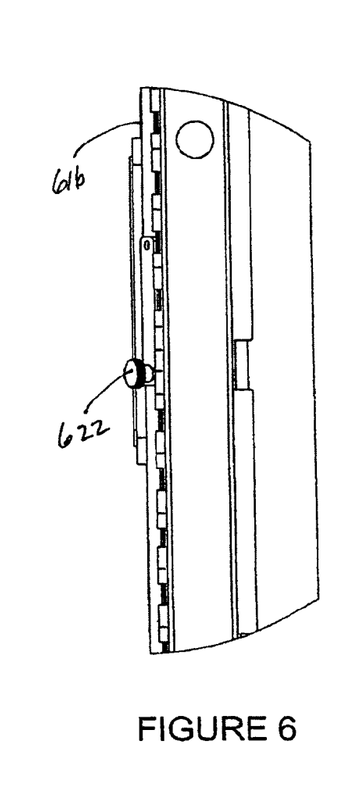
FIG. 6 is a right side elevational view of locking corridor.
Figure 7:
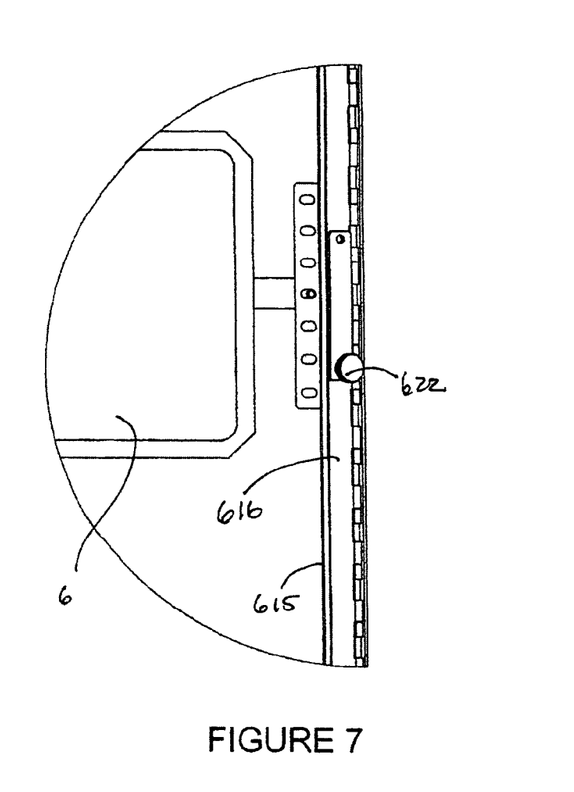
FIG. 7 is a front elevational view of the same.
Figure 8:
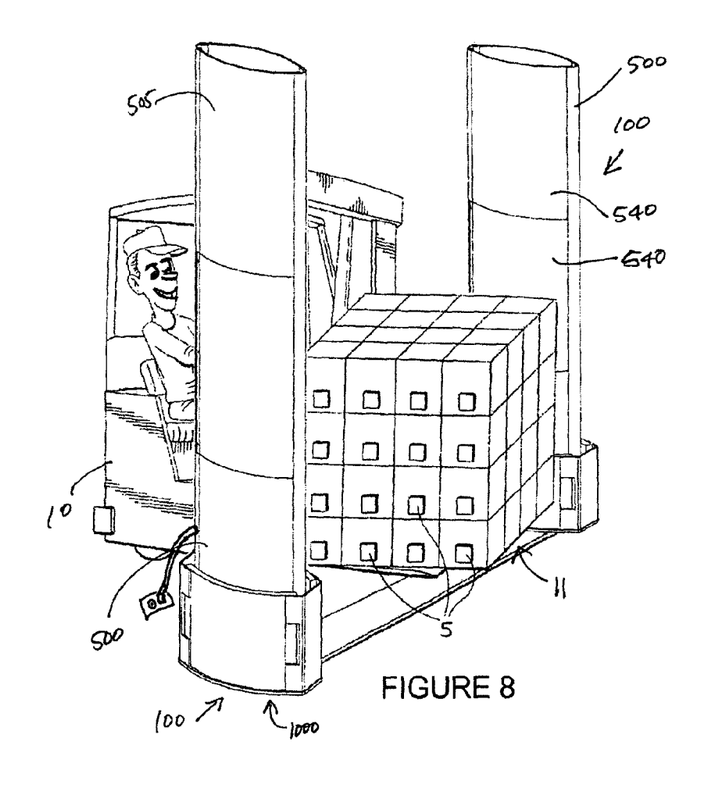
FIG. 8 is an environmental view of the RFID system housing.

The flanking sides 602, 603 of the vertical pieces 510, 520 provide means for attaching the tile exterior 505. Along one side of the housing (the left side as shown in the figures) is a locking channel 610 to engage the exterior tiles and along the opposing side is a lockable latch 621 adapted to engage the exterior tiles. The locking channel 610, as shown more clearly in FIGS. 2 and 4, has a front vertical piece 611 and rear vertical piece 612 in alternating positions. In this manner, a channel 610 is provided adapted to fit the side of an exterior tile within the channel 610 to frictionally engage the tile 540. The latch 621, as shown in detail in FIGS. 6 and 7, has a rear stationary portion 615 and front pivoting portion 616 which opens outward from the interior of the housing 100. In this manner, a latching channel 621 is provided adapted to fit the opposing side of an exterior tile 540 within the channel 621. When both sides of the exterior tile 540 are engaged within the channel 610, 621, the tile 540 is restricted from substantial movement. The stationary 615 and pivoting portions 616 of the latch 621 include an aperture 620 to allow a pin 622 to be placed through the portions prohibiting movement of the latch 621. To assist with pivoting the front portion 616, an arm 617 may be attached to the front portion 616 which can be gripped to pull the pivoting portion 616 open.

The frame 500 and the supporting mounts therein can be constructed of any durable material. It is envisioned that steel or another strong metal is the best material. At the base of the frame, a bollard 1000 is provided close to the base surrounding the frame 500. The bollard has vertical connector pieces 1015, 1025 on both sides 1010, 1020 constructed of metal or other durable material. Protective exterior tiles like those used for the exterior tiles may be installed between the vertical connector pieces 1015, 1025.

The tile exterior 541 is attached to the frame portion. The tile exterior extends along the longitudinal axis. A portion of the frame 500, the RFID readers 7, and the antennas 6 are located within the tile exterior. The tile exterior 541 is composed of one or more tiles 540 formed from an impact resistant thermoplastic resin. Some commonly used thermoplastic resins include polyethylene, polypropylene and polyvinyl chloride (PVC). High density polyethylene (HDPE) is a preferred thermoplastic resin as is with linear low density polyethylene (LLDPE) and low density polyethylene (LDPE). Especially advantageous are mixes of HDPE and LLDPE and LDPE, which combine benefits of all three plastic types. The tiles 540 for an arcuate exterior to limit damage to vehicles striking the housing 100. To allow a user to view the inside of the housing, an in particular the reader 7 which may have an information panel, the tiles 540 may include a transparent panel insert exposing the information panel of the RFID reader.

The benefits of the housing and durability of the tiles has been reviewed by Consumer Testing Laboratories, Inc. Specifically, the housing, tested under the term "EPC Stand" demonstrated satisfactory durability throughout testing with only slight damage noted to the front and back tiles when subjected to impact tests. The test sample demonstrated satisfactory resistance to surface impacts with no adverse effects when subject to multiple impact tests of 1.18-lb steel sphere dropped from heights up to eleven feet as well as impacts from a swinging 50-lb load from a distance of 36-inches from the front tiles. As a result of these tests, the sphere at heights greater than six feet made very small indentions to the frame and the swinging 50-lb load made very slight marks to the front tiles. Four severe impacts from a 2,000-lb fork truck with a pallet load of 400-lb caused no major damage to the overall housing. During these impact tests, the driver was instructed to stop once contact was made to the housing. The fork truck and pallet were centered in front of the housing and the middle tile was impacted with the front leading edge of the pallet and the corner of the pallet. Slight marks were noted to the tile when impacted with the front leading edge of the pallet. When impacted with the fork truck from a 45° angle, the pallet pushed in the front plastic tile and popped out the back tile. Slight marks were also noted to the tile when impacted with the corner of the pallet. The tiles however remained serviceable.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically referring to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures.

What is claimed is:

1. A housing for a radio frequency identification (RFID) system having a radio frequency antenna and an RFID reader having an information panel, said housing comprising:
 a frame having a base and extending along the longitudinal axis of said housing, said frame having at least one antenna mount adapted to attach the radio frequency antenna to said frame and at least one reader mount adapted to attach the RFID reader to said frame;
 an arcuate tile exterior attached to said frame, said tile exterior having at least one tile having spaced apart sides;
 a locking channel connected to said frame and extending along the longitudinal axis of said housing, said locking channel having a front portion and rear portion adapted to frictionally engage one side of said at least one tile;
 a lockable latch connected to said frame and extending along the longitudinal axis of said housing, said lockable latch having a stationary portion and a latch pivotally connected to said frame, said stationary portion and said latch adapted to captivate the opposing side of said at least one tile;
 a pin adapted to selectively lock and unlock said latch.

2. The housing of claim 1, wherein the frame has at least one port providing remote data transmission access and remote electrical supply access.

3. The housing of claim 1, wherein said tile exterior has a transparent panel insert exposing the information panel of the RFID reader.

4. The housing of claim 1, further comprising a bollard proximate to said base of said frame and having at least one protective tile.

5. The frame of claim 1, further having at least two antenna mounts adapted to attach radio frequency antennas of different sizes to said frame.

6. The frame of claim 1, further having at least one reader mount adapted to attach RFID readers of different sizes to said frame.

7. The tile exterior of claim 1, wherein said at least one tile is composed of a plastic selected from the group consisting of polyethylene, polypropylene, polyvinyl chloride, high density polyethylene, linear low density polyethylene, and low density polyethylene.

8. The tile exterior of claim 1, wherein said at least one tile is composed of a plastic composed of a combination of high density polyethylene, linear low density polyethylene, and low density polyethylene.

9. A housing for a radio frequency identification (RFID) system having a radio frequency antenna and an RFID reader having an information panel, said housing comprising:
 a frame having a base and extending along the longitudinal axis of said housing, said frame having at least two antenna mounts adapted to attach radio frequency antennas of different sizes to said frame and at least one reader mount adapted to attach RFID readers of different sizes to said frame;
 an arcuate tile exterior attached to said frame, said tile exterior having at least one tile;
 a locking channel connected to said frame and extending along the longitudinal axis of said housing;
 a lockable latch connected to said frame and extending along the longitudinal axis of said housing, said lockable latch having a stationary portion, a latch pivotally connected to said frame, and a pin adapted to selectively lock and unlock said latch.

10. The housing of claim 9, wherein the frame has at least one port providing remote data transmission access and remote electrical supply access.

11. The housing of claim 9, wherein said tile exterior has a transparent panel insert exposing the information panel of the RFID reader.

12. The housing of claim 9, further comprising a bollard proximate to said base of said frame and having at least one protective tile.

13. The frame of claim 9, further having at least one reader mount adapted to attach RFID readers of different sizes to said frame.

14. The tile exterior of claim 9, wherein said at least one tile is composed of a plastic selected from the group consisting of polyethylene, polypropylene, polyvinyl chloride, high density polyethylene, linear low density polyethylene, and low density polyethylene.

15. A housing for a radio frequency identification (RFID) system having a radio frequency antenna and an RFID reader having an information panel, said housing comprising:
 a frame having a base and extending along the longitudinal axis of said housing, said frame having at least one port providing remote data transmission access and remote electrical supply access, at least one antenna mount adapted to attach the radio frequency antenna to said frame, and at least one reader mount adapted to attach the RFID reader to said frame;
 an arcuate tile exterior attached to said frame, said tile exterior having at least one tile composed of a durable material;
 a locking channel connected to said frame and extending along the longitudinal axis of said housing, said locking channel having a front portion and rear portion;
 a lockable latch connected to said frame and extending along the longitudinal axis of said housing, said lockable latch having a stationary portion, a latch pivotally connected to said frame, and a pin adapted to selectively lock and unlock said latch.

16. The housing of claim 15, wherein said tile exterior has a transparent panel insert exposing the information panel of the RFID reader.

17. The housing of claim 15, further comprising a bollard proximate to said base of said frame and having at least one protective tile.

18. The tile exterior of claim 15, wherein said at least one tile is composed of a plastic selected from the group consisting of polyethylene, polypropylene, polyvinyl chloride, high density polyethylene, linear low density polyethylene, and low density polyethylene.

19. The frame of claim 15, said at least one antenna mount having at least two apertures adapted to attach radio frequency antennas of different sizes to said frame.

20. The frame of claim 15, said at least one reader mount having at least two apertures adapted to attach RFID readers of different sizes to said frame.

* * * * *